(12) United States Patent
Millet et al.

(10) Patent No.: US 9,318,909 B2
(45) Date of Patent: Apr. 19, 2016

(54) METHOD FOR CONTROLLING A POWER SUPPLY SYSTEM OF AN AUTOMOTIVE VEHICLE AND POWER SUPPLY SYSTEM ADAPTED TO SUCH A METHOD

(75) Inventors: Michael Millet, Moidieu Detourbe (FR); Philippe Le Brusq, Lyons (FR)

(73) Assignee: Volvo Truck Corporation, Göteborg (SE)

( * ) Notice: Subject to any disclaimer, the term of this patent is extended or adjusted under 35 U.S.C. 154(b) by 216 days.

(21) Appl. No.: 13/990,444

(22) PCT Filed: Dec. 21, 2010

(86) PCT No.: PCT/IB2010/003498
§ 371 (c)(1),
(2), (4) Date: May 30, 2013

(87) PCT Pub. No.: WO2012/085615
PCT Pub. Date: Jun. 28, 2012

(65) Prior Publication Data
US 2013/0257344 A1 Oct. 3, 2013

(51) Int. Cl.
*H02J 7/00* (2006.01)
*G07C 5/08* (2006.01)
(Continued)

(52) U.S. Cl.
CPC ........... *H02J 7/0054* (2013.01); *B60L 11/1805* (2013.01); *B60L 11/1816* (2013.01); *B60L 11/1846* (2013.01); *B60L 11/1861* (2013.01); *B60L 11/1868* (2013.01); *G07C 5/008* (2013.01); *G07C 5/0816* (2013.01); *B60L 2210/10* (2013.01); *B60L 2230/30* (2013.01);
(Continued)

(58) Field of Classification Search
CPC ............................... B60R 16/03; H02J 7/0054
USPC .................................................... 320/104, 103
See application file for complete search history.

(56) References Cited

U.S. PATENT DOCUMENTS

| | | | |
|---|---|---|---|
| 2001/0020204 A1 | 9/2001 | Runyon et al. | |
| 2002/0105443 A1* | 8/2002 | Flick | 340/988 |

(Continued)

FOREIGN PATENT DOCUMENTS

| | | |
|---|---|---|
| EP | 1900602 A1 | 3/2006 |
| FR | 2827711 A1 | 1/2003 |

(Continued)

OTHER PUBLICATIONS

Japanese Official Action Nov. 14, 2014 (translation) for corresponding Japanese Application 2013-545514.

(Continued)

*Primary Examiner* — Edward Tso
*Assistant Examiner* — Ahmed Omar
(74) *Attorney, Agent, or Firm* — WRB-IP LLP

(57) ABSTRACT

A method is provided for controlling a power supply system of an automotive vehicle that includes at least one battery and at least one associated battery managing unit adapted to monitor the state of charge of the battery. During an off state of the vehicle, the state of charge level of each battery is monitored by the battery managing unit. If the state of charge monitored reaches a low state of charge threshold, an on-board communication device adapted to emit a critical state of charge level alarm to be received by an off-board reception device is activated. The power supply system includes a battery managing unit per battery and an alarm to emit a critical state of charge level alarm.

9 Claims, 2 Drawing Sheets

(51) Int. Cl.
*B60L 11/18* (2006.01)
*G07C 5/00* (2006.01)

(52) U.S. Cl.
CPC ...... *B60L 2240/547* (2013.01); *B60L 2240/549* (2013.01); *B60L 2240/72* (2013.01); *B60L 2250/10* (2013.01); *G07C 5/006* (2013.01); *Y02T 10/7005* (2013.01); *Y02T 10/7044* (2013.01); *Y02T 10/7066* (2013.01); *Y02T 10/7088* (2013.01); *Y02T 10/7216* (2013.01); *Y02T 10/7291* (2013.01); *Y02T 30/14* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01)

(56) References Cited

U.S. PATENT DOCUMENTS

2008/0234897 A1 9/2008 Tsuchida
2009/0015193 A1* 1/2009 Esaka ...................... B60K 6/28
320/103

FOREIGN PATENT DOCUMENTS

| GB | 2455160 A | 6/2009 | | |
|---|---|---|---|---|
| JP | 11-164494 | 6/1999 | | |
| JP | 2004-142661 | 5/2004 | | |
| JP | 2004357377 | 12/2004 | | |
| JP | 2007-152983 | 6/2007 | | |
| JP | 2007-161000 | * | 6/2007 | ............. B60R 16/03 |
| JP | 2007161000 A | 6/2007 | | |

OTHER PUBLICATIONS

International Search Report for corresponding International application No. PCT/IB2010/003498.

Japanese Official Action Jul. 24, 2014 (translation) for corresponding Japanese Application 2013-545514.

* cited by examiner

METHOD FOR CONTROLLING A POWER SUPPLY SYSTEM OF AN AUTOMOTIVE VEHICLE AND POWER SUPPLY SYSTEM ADAPTED TO SUCH A METHOD

BACKGROUND AND SUMMARY

The invention relates to a method for controlling a power supply system of an automotive vehicle, comprising at least one battery and a battery managing unit adapted to monitor the state of charge of said battery. The invention also relates to a power supply system adapted to such a method.

Automotive vehicles are generally equipped with one or several batteries. When the vehicle is left unused for a period of time, batteries may become depleted for various reasons. First of all, even when a vehicle is in an off-state, there usually are a number of electric or electronic devices which are connected to the batteries and which draw small currents from the battery. For example, if the vehicle is equipped with a remote keyless door locking system, the electronic control unit for that system needs to stay active to control the system so that it can detect that an authorized user wants to access to the vehicle. Also, a battery may be subject to self-discharge when the vehicle is not used fir a relatively long period. In both cases, this might result in the vehicle not being operational when the user wants to use it. Moreover, if such a period lasts too long, resulting in a strong depletion of the battery, such battery discharging can damage the battery and can lead to a deterioration of its charging and discharging abilities. In case a company owns several vehicles, deterioration of batteries can lead to the inability to move some vehicles and the need to replace several batteries, inducing relatively high maintenance costs and financial losses.

This issue is particularly important in the domain of hybrid automotive vehicles, which comprise a high voltage battery, which delivers the electric power needed for traction purposes, and a low voltage battery, which usually delivers power to on-board electronic systems and to low power on-board electric auxiliaries, such as vehicle lights, windshield wipers, etc. . . . . To limit the risk of damaging the high voltage battery, it is known, for example from JP-2007.161,000, to detect a low state of charge of the low voltage battery and to recharge the low voltage battery by transferring electric power from the high voltage battery, thanks to a direct current/direct current (DC/DC) converter.

Such system does not prevent damaging of a battery, it can only postpone it for some time, hoping that during that extra time somebody will use the vehicle or at least maintain it. Such system does not allow for example to perform maintenance operations in due time before the low voltage battery reaches a too low state of charge level to operate properly.

It is desirable to provide a new method for controlling a power supply system of an automotive vehicle which allows to inform a remote system or person that a battery of the vehicle is likely to be damaged, so as for example to allow the system or person to perform maintenance operations or to take other actions before the damage is too important.

An aspect of the invention concerns a method for controlling a power supply system of an automotive vehicle, comprising at least one battery and an associated battery managing, unit adapted to monitor the state of charge of said battery. This method is characterized in that it comprises the following steps:

a) during an off state of the vehicle, monitoring of the state of charge level of the or each battery by its associated battery managing unit.

b) if the state of charge monitored at step a) reaches a low state of charge threshold, activation of an on-board communication device adapted to emit a critical state of charge level alarm to be received by an off-board reception device.

Thanks to an aspect of the invention, if a battery on the vehicle is approaching a critical state of charge level, meaning that damage could appear on the battery, a communication device of the power supply system is activated so as to send out an alarm signal. Through this alarm, it is possible to warn a system or a person, for example the owner of the vehicle, that a battery of his vehicle may be damaged if the vehicle is left in its off state any longer and if nothing is done to recharge the battery.

According to further aspects of the invention which are advantageous but not compulsory, such a method may incorporate one or several of the following, features.

At step a), the respective states of charge of a high voltage battery and a low voltage battery of the vehicle are monitored, and whereas the method comprises a further step of:

c) activation of a converter electrically connecting the high voltage battery to the service battery.

The method comprises a further step of:

d) If, at step a), it is determined that the state of charge of any of the high voltage battery and the low voltage battery has reached a low threshold, then recharging of said battery by the other battery through the DC/DC converter.

Step d) is conditional upon a recharging instruction, for example for allowing or inhibiting such recharging, received by the on-board communication device from an off-board communication device The on-board communication device implements a remote wireless communication protocol.

The invention also concerns, according to an aspect thereof a power supply system for an automotive vehicle, comprising at least one battery equipped and an associated battery managing unit adapted to monitor the state of charge of said battery. This power supply system is characterized in that the battery managing unit associated to the or each battery is adapted to monitor the state of charge of said battery when the vehicle is in an off state, and in that it comprises means to emit a critical state of charge alarm to be received by an off-board reception device, when the state of charge monitored by the battery managing unit associated to the or each battery reaches a low threshold.

According to further aspects of the invention which are advantageous but not compulsory, such a power supply system may incorporate one or several of the following features:

The power supply system comprises a high voltage battery and a low voltage battery, and wherein it comprises means to charge the high voltage battery with the low voltage battery when the state of charge of the high voltage battery reaches a low threshold, or to charge the low voltage battery with the high voltage battery when the state of charge of the low voltage battery reaches a low threshold.

The means to charge the high voltage battery or the low voltage battery comprise a DC/DC converter.

The DC/DC converter comprises a dedicated control unit adapted to communicate with the respective battery managing unit(s) associated to the high voltage, battery and the low voltage battery.

The means to emit a critical state of charge alarm comprise a communication device adapted to send alarms to a server off-board the vehicle.

The communication device is adapted to receive instructions from the server.

The communication device is wireless, for example using, a GPRS communication protocol.

BRIEF DESCRIPTION OF THE DRAWINGS

The invention will now be explained in correspondence with the annexed figures and as an illustrative example, without restricting, the invention. In the annexed figures.

DETAILED DESCRIPTION

Figure 1:
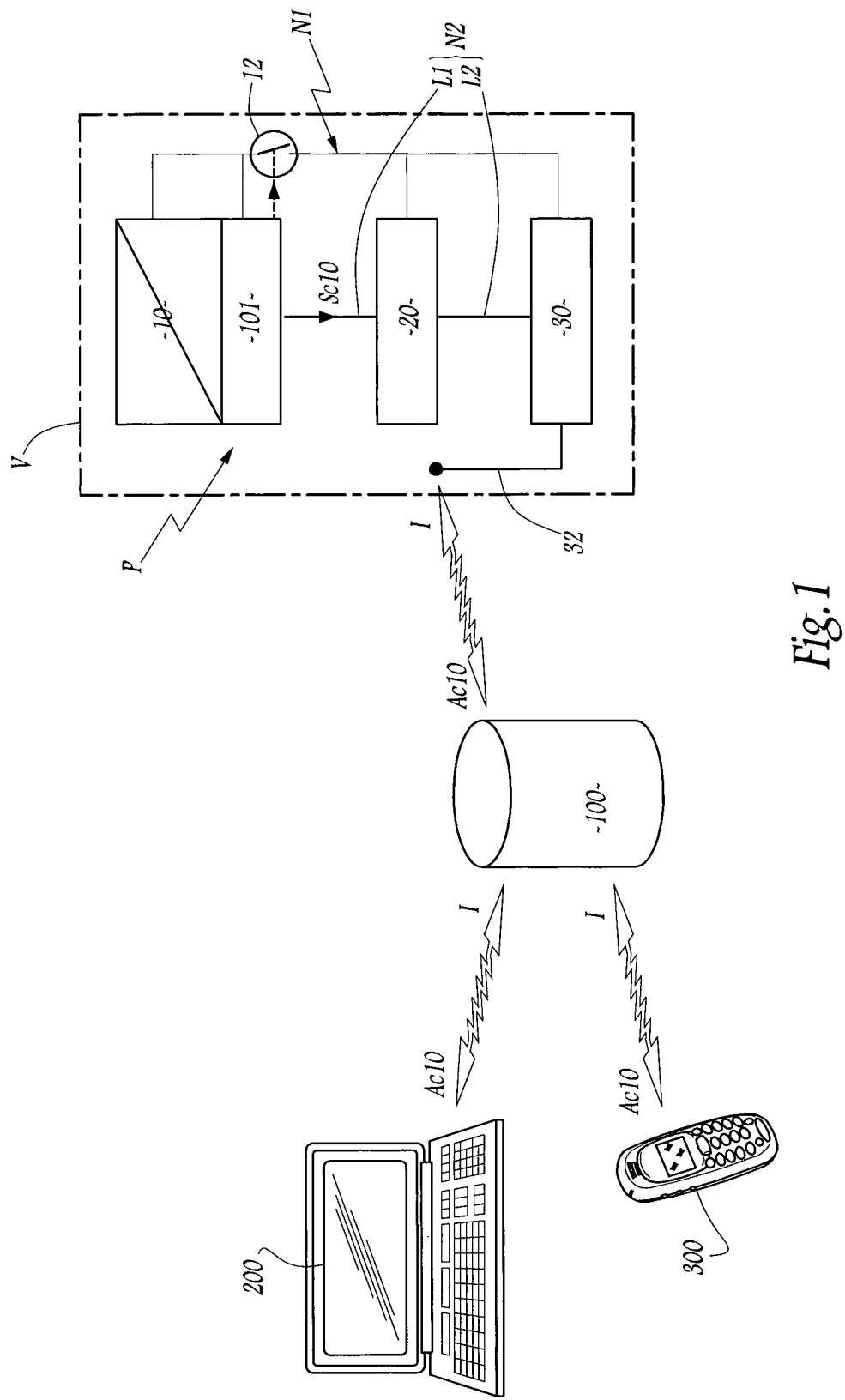
FIG. 1 is a schematic view of a power supply system according to a first embodiment of the invention.

According to a first embodiment of the invention represented on FIG. 1, an automotive vehicle V is equipped with a power supply system P comprising, a low voltage service battery 10, which can have, for example, a 24V nominal voltage. Service battery 10 is connected to a non-shown onboard electrical service network to which, for example, lights, wipers, or other electrical equipments of the vehicle are connected. In normal operation of the vehicle, service battery 10 is recharged by a non-shown internal combustion engine of vehicle V thanks to an alternator. During of periods of the vehicle, service battery 10 may experience discharging.

A battery managing unit (BMU) 101 is associated to service battery 10, which is adapted to monitor the state of charge of service battery 10.

BMU 101 is essentially an electronic control unit permanently fed with electrical current by service battery 10 thanks to a communication feeding network N1, which originates from service battery 10 and also provides electrical current to a gateway 20 and to a telematic gateway 30. Gateway 20 is adapted to communicate with BMU 101 thanks to electrical signals transmitted in a data line or databus L1 which belongs to a communication network N2. Gateway 20 is adapted to communicate with telematic gateway 30 thanks to electronic signals transmitted in a data line L2 belonging to network N2. The gateway 20 is optional and can be a component allowing the transfer of an electronic signal between a first part of a communication network N2 and a second part of communication network N2

Telematic gateway 30 is a remote communication device, preferably wireless, which is adapted, thanks to an antenna 32, to emit communication signals from the vehicle to a communication device off-board the vehicle, such as a communication server 100 which can be reached directly, but in most cases indirectly through, for example, a telephone network, a data network and/or through the internet. Communication server 100 can be located, for example, at a repair shop or in a managing center of a fleet of professional vehicles. Server 100 is preferably adapted to transmit signals directly or indirectly to devices like a computer 200 or a mobile phone 300, to receive signals from computer 200 and from mobile phone 300 and to transmit these signals to telematic gateway 30. These signals can consist in or comprise alarms, operating instructions, technical data or other contents.

According to an optional feature, gateway 20 and telematic gateway 30 can be connected or disconnected to network N1 thanks to a switch 12 controlled by BMU 101 via an electric signal S12.

The method of the invention is implemented as follows: during an off state period of the vehicle, which may correspond to a period when the vehicle is, for example, parked in a garage with the switch key off the state of charge of service battery 10 is permanently monitored by BMU 101. While gateway 20 and telematic gateway 30 are deactivated, BMU 101 is still activated so as to measure the state of charge of service battery 10. The off state of a vehicle is dependent on the type of vehicle and especially on how its electric/electronic architecture is designed. In any case, it can be considered as the state of the vehicle when it is parked, and when only a strict minimum of electric/electronic components are active in that they draw some current from the battery in order to perform at least part of their functions. In modern vehicles with complex architectures, the vehicle typically only reaches its off state some minutes or tens of minutes after the vehicle has been parked, possibly locked and after no action on the vehicle systems has been detected. It can be noted that some vehicles have a normal off-state, and a critical off-state which may be triggered for example if the battery state of charge reaches a low threshold.

In case the state of charge (SOC) of service battery 10 reaches a low threshold, which can be, for instance, comprised between 30 and 50% of the nominal state of charge of battery 10, BMU 101 generates a critical state of charge level signal Sc10 in network N2 whereby other components of the vehicle such as the gateway 20 and telematic gateway 30 are activated. In one example, such components shift from a so-called sleep mode, where they perform no function, to as so-called active mode where they are able to interact with other components. Such activation can result from, or depend on, switch 12 being controlled by BMU 101 so as to connect service battery 10 to gateway 20 and to telematic gateway 30.

Once gateway 20 and telematic gateway 30 are activated, a critical state of charge level alarm Ac10 can be emitted by telematic gateway 30 to off-board server 100 so as to warn that service battery 10 has been discharged to a critical level. This alarm can be emitted in the form of a message warning that the state of charge SOC of service battery 10 has reached a critical level and that an intervention is required. Server 100 may transmit, this alarm to, for example, the laptop 200 of the vehicle owner or his mobile phone 300. The alarm may also be transferred to a fleet management system or to a repair shop management system, for example so that the particular vehicle is prioritized for example in a vehicle use schedule or in a maintenance schedule. The communication between server 100 and the telematic gateway 30 is preferably wireless and can use regular telephone communication protocols and systems such as GSM, GPRS or UMTS. The communication could also be based on WiFi/WLAN, for example to link the server of a repair shop to the vehicles on its parking lot, or WiMax, etc. . . . . . In all these cases, the alarm emitted by the telematic gateway is not human-perceivable. It can be provided a human perceivable alarm to signal which vehicle has a battery at a low level of discharge, for example through a visual or sound alarm.

Figure 2:
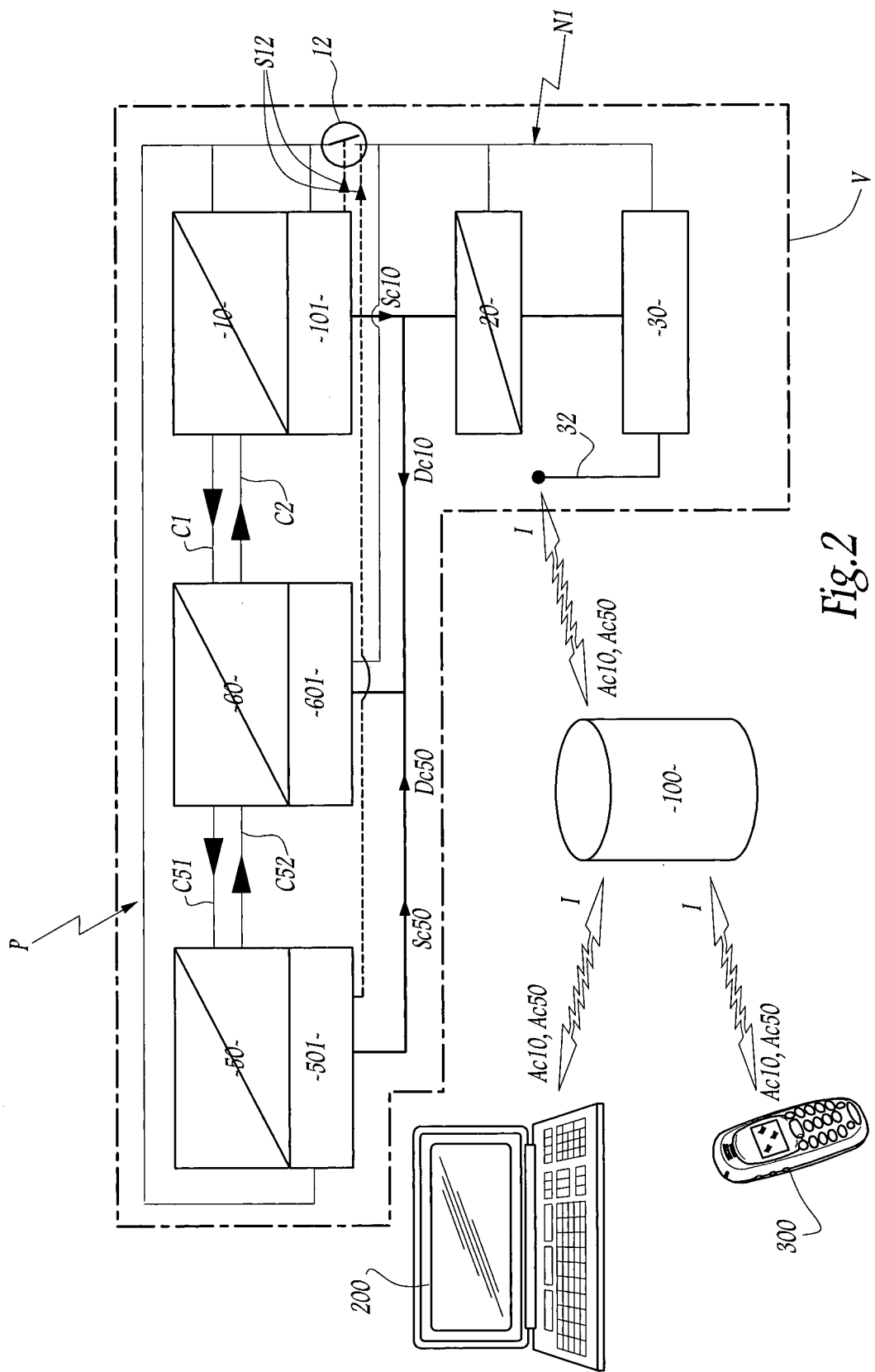
FIG. 2 is a schematic view of a power supply system according to a second embodiment of the invention.

In the embodiment of FIG. 2, elements similar to those of the first embodiment bear the same references, and work in the same way.

According, to the second embodiment of the invention represented on FIG. 2, power supply system P of vehicle V comprises, in addition to the elements described in connection to the first embodiment, a traction high voltage battery 50, which is adapted to provide electrical current to a non-shown traction electric machine of the vehicle, in the case the vehicle is an electrically driven or hybrid-electric vehicle. The nominal voltage of traction battery 50 can be, for example, in the order of 300 to 600 volts.

Traction battery 50 is equipped with a dedicated BMU 501 which has the same features that BMU 101. BU 501 is connected to networks N1 and N2. BMU 501 is also adapted to control switch 12. Alternatively, both batteries could share a common battery management unit.

Service battery 10 and traction battery 50 are connected to a DC/DC converter 60 by respective electric cables C1 and C2, on one hand, and by cables C51 and C52 on the other hand. In these cables, electrical energy can be transferred from traction battery 50 to DC/DC converter 60, from DC/DC converter 60 to traction battery 60, from traction battery 50 to DC/DC converter 60, and from DC/DC converter 60 to service battery 10. In the embodiment, DC/DC converter 60 is a bi-directional converter, which transfers electrical energy either from traction battery 50 to service battery 10 or from service battery 10 to traction battery 50.

DC/DC converter 60 is equipped with a DC/DC converter control unit (DCU) 601 which controls the conversion rates of DC/DC converter 60. In other words, DCU 601 acts on the ratio between the input and output electrical currents of DC/DC converter 60.

DCU 601 is also connected to networks N1 and N2.

In this embodiment, the method is implemented as follows: the respective states of charge of service battery 10 and of traction battery 50 are, in the same way as in the first embodiment, monitored during an off period of the vehicle. If any one of BMU 101 and 501 detects a low state of charge level of the battery it is associated to, it generates, as in the first embodiment, a critical state of charge level signal Sc10 or Sc50 in communication network N2 so as to activate gateway 20 and telematic gateway 30 and to allow the emission of an alarm Ac10 or Ac50 signal to be received by off-board server 100.

Once the alarm has been emitted, the battery whose state of charge has reached a critical level is automatically recharged by transferring electrical energy from the other battery thanks to DC/DC converter 60. More precisely, in case service battery 10 has reached a critical state of charge level, simultaneously with the activation by BMU 101 of gateway 20 and telematic gateway 30, an electronic signal Dc10 is sent to DCU 601 via network N2, so that DCU 601 activates itself. Once DCU 601 is activated, it is then possible for DC/DC converter 60 to recharge service battery 10 by transferring electrical energy from traction battery 50 to service battery 10, the input and output currents of DC/DC converter 60 being adapted accordingly.

In a case a low state of charge level is detected in traction battery 50, the opposite operation is performed. EMU 501 activates DCU 601 via a signal Dc50 sent on network N2, so as to transfer electrical energy from service battery 10 to traction battery 50.

The invention can be implemented with different low state of charge levels for a given battery. For example, a first low state of charge level could correspond to a pre-warning, so that a first alarm would be purely informational, while not triggering the step of transferring energy from one battery to the other. Another low level, presumably inferior to the first level, would launch the step of energy transfer from one battery to the other. This other alarm level could also, in addition, be informational in direction to a person.

The transfer of electric energy can be stopped after a certain amount of energy has been transferred. This can correspond to a safe level of state of charge for the battery which was previously over-discharged, i.e. to a state of charge where the battery is not exposed to significant damaging, at least temporarily. Another possibility is to stop the energy transfer when the energy providing battery reaches a low state of charge level. To the contrary, it can be provided that the energy transfer is continued until the energy providing battery cannot provide any more energy, which may lead to that battery being damaged, and potentially irreversibly damaged.

Given the filet that because service battery 10 is generally much easier and cheaper to replace in case it is damaged, while the traction battery 50 can be very expensive and can need heavy operations to be replaced, it may be preferred to apply the latter strategy when performing a recharging of traction battery 50 from the service battery 10.

According to an alternative embodiment of the invention, the battery which has reached a low state of charge level is not automatically recharged. Following the reception, by the server 100, of the alarm warning that one of the two batteries has reached a critical state of charge level, the server can transmit instructions I for allowing or inhibiting the recharging, of the battery. The instructions can be computed by the server system or by a system connected to the server, such as a fleet management system. The instructions can be generated by a person, for example a fleet manager, a repair shop worker, or a driver, through the use of a laptop 200, mobile phone 300 or any other adapted mean.

The system or the person can decide to perform the recharging of the heavily discharged battery. In that case, an instruction is transmitted to telematic gateway 30 through server 100 so as to initiate the recharging operation. Telematic gateway 30 then transmits this instruction to the BMU 3 of the discharged battery so that this BMU 1 activates DCU 601 and initiates the recharging operation. For instance, the system or the person can decide to recharge traction battery 50, having in mind that service battery 10 is easier and cheaper to replace.

In another case, the system or the person can decide not to perform a recharging of the discharged battery, for example because the discharged battery is to be anyhow replaced by a fully loaded battery, because the vehicle is to be used shortly, or because the discharged battery is to be recharged by other means, without discharging the other battery of the vehicle. For example, in ease service battery 10 is discharged, its recharging could induce a too heavy discharging of traction battery 50, and lead to damages on traction battery 50. The system or person could prioritize the recharging of service battery 10 by performing a human maintenance operation so as to prevent possible damages on traction battery 50.

The method described in connection to the first embodiment for a service low voltage battery can also be implemented with a traction high voltage battery. Furthermore, the first embodiment of the invention, where only one battery is monitored, can be implemented in a vehicle having two or more batteries. For example, in a hybrid-electric vehicle having a high voltage traction battery and a low voltage service battery, it may be chosen to monitor only the high voltage traction battery and not to provide the possibility to transfer energy between the batteries during the off state, contrary to what is provided in the second embodiment. In a variant of the second embodiment, the DC/DC converter between the two batteries could be mono-directional, in which case transfer of energy during the off state could occur only in one direction.

The invention can also be implemented with more than two batteries, and with various types of batteries, such as lead-acid, lithium-ion, NIMH, etc.

The invention can be implemented with any kind of vehicle. It is particularly advantageous with a fleet of trucks.

The invention claimed is:

1. Method for controlling a power supply system of an automotive vehicle, comprising a traction high voltage battery and a service low voltage battery and at least one associated battery managing, unit adapted to monitor the state of charge of the batteries, comprising:

a) during an off state of the vehicle, monitoring of the state of charge level of the at least one battery by the battery managing unit, b) if the state of charge monitored at step a) reaches a first low state of charge threshold, activation of an on-board communication device adapted to emit a critical state of charge level alarm to be received by an off-board reception device, c) if, at step a), it is determined that the state of charge of any of the traction battery and the service battery has reached a second low threshold, then activating a converter electrically connecting the traction battery to the service battery, and recharging of the battery that has reached the second low threshold by transferring energy from the other battery through the DC/DC converter, and d) transferring energy from the other battery through the DC/DC converter until the other battery cannot provide more energy.

2. Method according to claim 1, comprising performing step c) upon receipt of a recharging instruction by the on-board communication device from an off-board communication device.

3. Method according to claim 1, wherein the on-board communication device implements a remote wireless communication protocol.

4. Power supply system for an automotive vehicle, comprising
 at least one battery and at least one associated battery managing unit adapted to monitor a state of charge of the at least one battery,
 wherein the battery managing unit associated to each battery is adapted to monitor the state of charge of the at least one battery when the vehicle is in an off state, and comprises means to emit a critical state of charge alarm to be received by an off-board reception device when the state of charge monitored by the battery managing unit associated to the or each battery reaches a low threshold, the means to emit a critical state of charge alarm being connectable to the battery through a first network comprising a switch, and being activated upon a signal through a second network,
 a high voltage battery and a low voltage battery, and
 means to charge at least one of a.) the high voltage batter with the low voltage battery when the state of charge of the high voltage battery reaches a high voltage battery low threshold and b.) the low voltage battery with the high voltage battery when the state of charge of the low voltage battery reaches a low voltage battery low threshold, the charging means being arranged to provide energy from at least one of the low voltage battery and the high voltage battery serving as a charging battery to charge the at least one of the high voltage battery and the low voltage battery, respectively, until the charging battery cannot provide more energy.

5. Power supply system according to claim 4, wherein the means to charge the high voltage battery or the low voltage battery comprise a DC/DC converter.

6. Power supply system according to claim 5, wherein the DC/DC converter comprises a dedicated control unit adapted to communicate with the respective battery managing unit(s) associated to the high voltage battery and to the low voltage battery.

7. Power supply system according to claim 4, wherein the means to emit a critical state of charge alarm comprise a remote communication device adapted to send alarms to a server off-board the vehicle.

8. Power supply system according, to claim 7, wherein the remote communication device is adapted to receive instructions from the server.

9. Power supply system according to claim 7, wherein the remote communication device is wireless.

* * * * *